US006555258B1

(12) United States Patent
Mou

(10) Patent No.: US 6,555,258 B1
(45) Date of Patent: Apr. 29, 2003

(54) IMAGE TRANSFER SHEET

(76) Inventor: Chuan-Li Mou, 1 Fl., No. 128, Sec. 2, Neihu Rd., Taipei (TW)

( * ) Notice: Subject to any disclaimer, the term of this patent is extended or adjusted under 35 U.S.C. 154(b) by 57 days.

(21) Appl. No.: 09/976,131

(22) Filed: Oct. 11, 2001

(51) Int. Cl.[7] ................................. B41M 3/12
(52) U.S. Cl. .................. 428/914; 428/202; 428/204; 428/40.1; 503/227; 430/216; 430/217; 427/149
(58) Field of Search ..................... 428/914, 202, 428/204, 40.1; 503/227; 430/216, 217, 126; 427/149

(56) References Cited

U.S. PATENT DOCUMENTS

| 4,155,707 A | * | 5/1979 | Franceschini et al. | 8/467 |
| 4,288,524 A | * | 9/1981 | Bilofsky et al. | 430/220 |
| 4,614,363 A | * | 9/1986 | Breen | 462/55 |
| 4,923,780 A | * | 5/1990 | Taylor, Jr. | 430/357 |
| 5,486,397 A | * | 1/1996 | Gordon et al. | 428/76 |
| 5,705,315 A | * | 1/1998 | Benzing et al. | 430/259 |
| 5,800,962 A | * | 9/1998 | Benzing et al. | 430/259 |
| 5,851,614 A | * | 12/1998 | Buck | 428/40.1 |
| 6,218,068 B1 | * | 4/2001 | Tanaka et al. | 430/138 |
| 6,322,876 B1 | * | 11/2001 | Lythgoe et al. | 428/195 |
| 6,364,984 B1 | * | 4/2002 | Ueno et al. | 156/235 |
| 6,364,992 B1 | * | 4/2002 | Nambu et al. | 156/277 |

* cited by examiner

Primary Examiner—Cynthia H. Kelly
Assistant Examiner—Tamra L. Dicus
(74) Attorney, Agent, or Firm—Alan Kamrath; Rider, Bennett, Egan & Arundel, LLP

(57) ABSTRACT

An image transfer sheet include a substrate having a water permeability, an image dye layer containing a negative image overlaid on the substrate, a white dye layer overlaid on the image dye layer, a transfer layer made of a water-soluble epoxy resin and overlaid on an upper surface of the white dye layer and enclosing peripheries of the white dye layer and the image dye layer, and a protective layer overlaid on the transfer layer. Whereby the negative image in the image transfer sheet can be readily and quickly transferred to be a positive image printed on an object, the image printed on the object has a high abrasive resistance and a long durability.

8 Claims, 2 Drawing Sheets

IMAGE TRANSFER SHEET

BACKGROUND OF THE INVENTION

1. Field of the Invention

The present invention relates to an image transfer sheet for quick printing of a full color image on a surface of an object, and the image printed on the object having a high abrasive resistance and a long durability.

2. Description of Related Art

Presently various kinds of image transfer sheet materials are sold on the market for use in printing images on various objects, such as metal, wood, cloth etc. A conventional image transfer sheet normally has a complex structure, wherein a layer of paper or plastic film is specially provided in cooperation with a pressure-sensitive type resin. The images printed by means of the conventional image transfer sheets are often peeled from corners or sides thereof, and normally have significant thickness and rough surface, which are obviously not ideal.

One type of the conventional water-soluble image transfer sheet must be used in cooperation with an adhesive, which has to be cleaned by a volatile solvent and such a solvent creates trouble during use and disposal.

Another type of the conventional image transfer sheet must be thermal treated to complete a transfer of the image which requires special equipment and skills.

Therefore, it is an objective of the invention to provide an improved image transfer sheet to mitigate and/or obviate the aforementioned problems.

SUMMARY OF THE INVENTION

The main object of the present invention is to provide an image transfer sheet consisting of a substrate having a water permeability, an image dye layer containing a negative image overlaid on the substrate, a white dye layer overlaid on the image dye layer, a transfer layer made of a water-soluble epoxy resin overlaid on an upper surface of the white dye layer and enclosing peripheries of the white dye layer and the image dye layer, and a protective layer overlaid on the transfer layer. Whereby the negative image of the image transfer sheet is readily and quickly transferred to be a positive image printed on an object, and the positive image printed on the object having a high abrasive resistance and a long durability.

Other objects, advantages and novel features of the invention will become more apparent from the following detailed description when taken in conjunction with the accompanying drawings.

DETAILED DESCRIPTION OF THE PREFERRED EMBODIMENT

Figure 2:
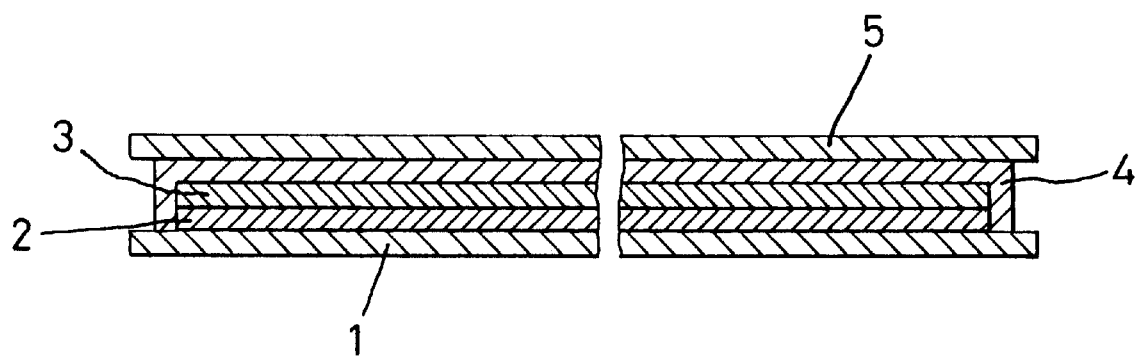
FIG. 2 is a cross sectional view of the image transfer sheet in accordance with the invention.

As shown in FIG. 2, the present invention relates to an image transfer sheet, which consists of a substrate (1), an image dye layer (2), a white dye layer (3), a transfer layer (4) and a protective layer (5).

Figure 1:
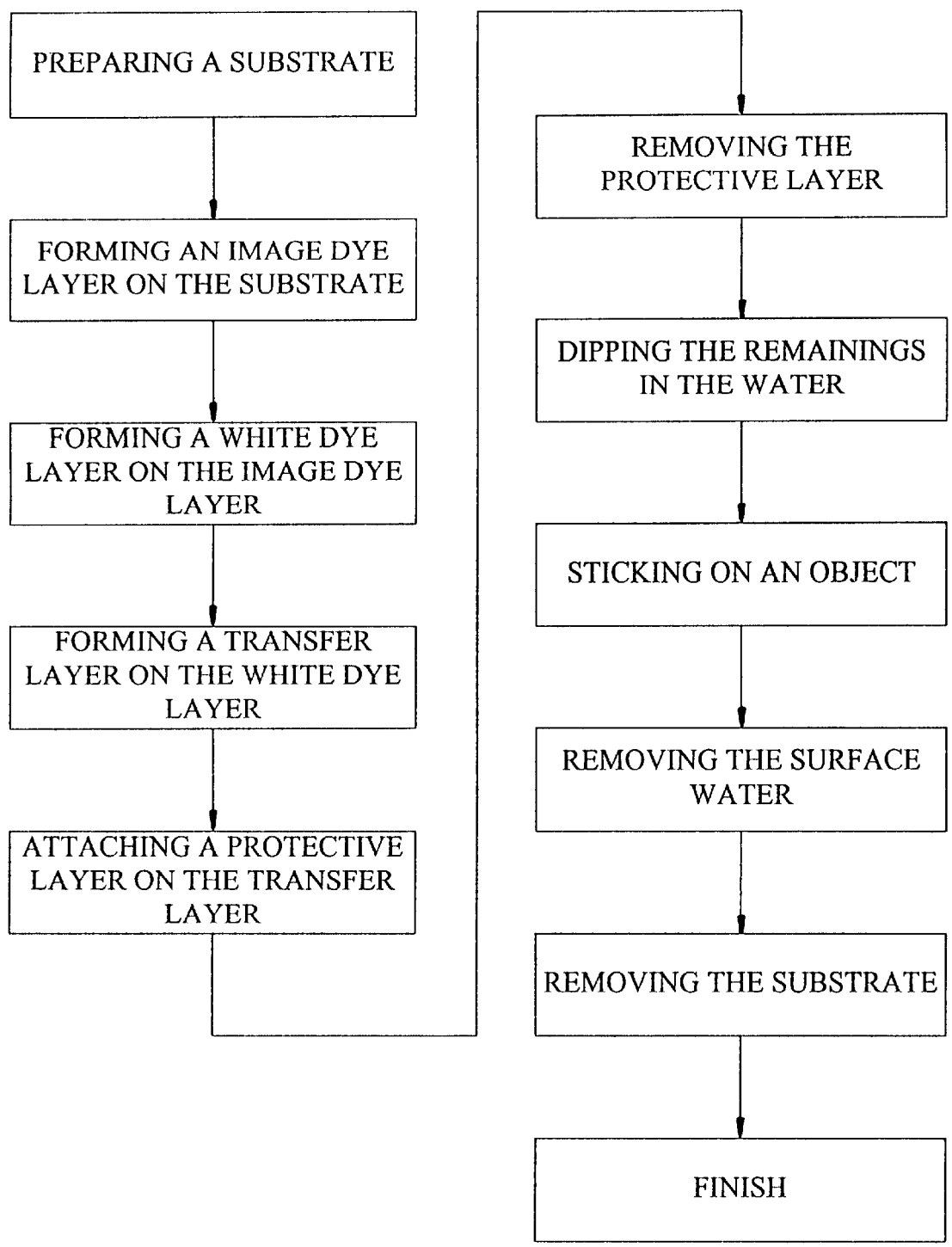
FIG. 1 is a schematic view of a processing flow chart of production and print method of an image transfer sheet in accordance with the invention.

With reference to FIG. 1, a schematic drawing of a processing flow chart illustrates production and printing method of the image transfer sheet of the invention.

The substrate (1) is made of a water permeable sheet material and has one side thereof applied with a water-soluble adhesive coating and treated to have a glossiness adapted for print image with high resolution rate thereon.

If a positive image is required to be printed on a surface of an object, the image dye layer (2) contains a negative image, which is printed on the substrate (1) by means of silk screen print or offset chromaticity print. The dried image dye layer (2) has a thickness about 0.01 mm after being evaporated at room temperature for about 8 hours. The white dye layer (3) is overlaid on the dried image dye layer (2) by means of silk screen printing or the offset printing. The dried white dye layer (3) has a thickness about 0.01 to 0.03 mm after being evaporated at room temperature for 4 to 8 hours.

After the white dye layer (3) is dried, the transfer layer (4) made of a water-soluble epoxy resin is applied on the white dye layer (3) to overlay on an upper surface of the white dye layer (3) and enclose peripheries of the image dye layer (2) and the white dye layer (3) by means of silk screen printing. Then the transfer layer (4) is dried after being evaporated at room temperature for about 4 hours.

Finally, the protective layer (5) made of polypropylene, polyethylene or polyester film is overlaid on the transfer layer (4), thus the image transfer sheet of the invention is manufactured without any additional anti-sticking treatment.

The image transfer sheet of the invention is adapted for printing on various objects, such as metal, wood, glass, ceramic, rubber etc. Before a transferring process takes place, a desired surface place of an object should be wetted with a little water. The image transfer sheet is first soaked in the water after the protective layer (5) has been peeled off manually by a user, and then stuck on the surface of the object to make the transfer layer abutted directly against the surface of the object. Then water remaining between the transfer layer (4) and the object is wiped out by the user. Finally, the substrate (1) is removed from the image dye layer (2) to expose a clear positive image printed on the surface of the object.

After the negative image of the image transfer sheet is transferred to be a positive on the object, the positive image printed on the object consists only of the image dye layer (2), the white dye layer (3) and the transfer layer (4), i.e., no plastic film or paper exists with the image, so that the image has only a very small thickness and a good surface touch sense.

Furthermore, because the transfer layer (4) overlaid on the upper surface of the white dye layer (3) encloses the peripheries of the white dye layer (3) and the image dye layer (2), the peripheries of the image are prevented from any water permeation, and the image printed by the image transfer sheet has a high abrasive resistance and a long durability.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An image transfer sheet consisting of:
   a substrate (1) having a water permeability;
   an image dye layer (2) overlaid on the substrate (1) and containing a negative image;
   a white dye layer (3) overlaid on the image dye layer (2);
   a transfer layer (4), which is made of a water-soluble epoxy resin, and overlaid on an upper surface of the white dye layer (3) and encloses peripheries of the white dye layer (3) and the image dye layer (2); and
   a protective layer (5) overlaid on the transfer layer (4).

2. The image transfer sheet as claimed in claim 1, wherein the image dye layer (2) is printed on the substrate (1) by means of silk screen printing.

3. The image transfer sheet as claimed in claim 1, wherein the image dye layer (2) is printed on the substrate (1) by means of offset chromaticity printing.

4. The image transfer sheet as claimed in claim 1, wherein the white dye layer (3) is printed on the substrate (1) by means of silk screen printing.

5. The image transfer sheet as claimed in claim 1, wherein the protective layer (5) is made of a plastic film material without an anti-sticking treatment.

6. The image transfer sheet as claimed in claim 5, wherein the protective layer (5) is made of a polypropylene film.

7. The image transfer sheet as claimed in claim 5, wherein the protective layer (5) is made of a polyethylene film.

8. The image transfer sheet as claimed in claim 5, wherein the protective layer (5) is made of a polyester film.

* * * * *